(12) United States Patent
Eysel et al.

(10) Patent No.: US 6,579,046 B2
(45) Date of Patent: Jun. 17, 2003

(54) TOOL HEAD

(75) Inventors: Dieter Eysel, Maintal (DE); Hartmut Hirt, Gelnhausen (DE)

(73) Assignee: Samson Aktiengesellschaft, Frankfurt (DE)

( * ) Notice: Subject to any disclaimer, the term of this patent is extended or adjusted under 35 U.S.C. 154(b) by 27 days.

(21) Appl. No.: 09/843,956

(22) Filed: Apr. 27, 2001

(65) Prior Publication Data

US 2002/0001512 A1 Jan. 3, 2002

(30) Foreign Application Priority Data

May 4, 2000 (DE) .......................................... 100 21 723

(51) Int. Cl.[7] ............................................. B23B 29/034
(52) U.S. Cl. ......................................... 408/150; 82/1.2
(58) Field of Search ................................ 408/147, 150, 408/151; 82/1.2, 1.4; 279/6

(56) References Cited

U.S. PATENT DOCUMENTS 4,708,543 A * 11/1987 Plutschuck et al. ......... 408/151

FOREIGN PATENT DOCUMENTS

| DE | 4218466 C2 | 7/1999 | |
| JP | 04365503 A | * 12/1992 | .................... 82/1.2 |

* cited by examiner

Primary Examiner—Steven C. Bishop
(74) Attorney, Agent, or Firm—Woodling, Krost and Rust

(57) ABSTRACT

The invention involves a tool head 10, which can be rotated around an axis of rotation 24, with a tool-holding fixture 14, 16 for a tool 20 having a cutting edge 18 and with equipment 38, 40, 44 for adjustment of the radial position of the tool cutting edge 18 with regard to the axis of rotation 24. The invention distinguishes itself by the fact that the tool-holding fixture is divided up into a base element 14, which is supported in a first bearing system 40 in a carrier sleeve 44 so as to be able to rotate around the axis of rotation 24, and a tool-holding element 16, which is supported in a second bearing system 38 in the carrier sleeve 44 so as to be able to rotate around an eccentric axis 42 that is positioned in an eccentric fashion, as well as in parallel to, the axis of rotation 24.

19 Claims, 5 Drawing Sheets

TOOL HEAD

This application claims priority of German Patent Application No. 100 21 723.0 filed May 4, 2000.

FIELD OF THE INVENTION

The invention involves a tool head that has the ability for radially adjusting the position of the cutting tool.

BACKGROUND OF THE INVENTION

A tool head of this type is known, for example, from DE 42 18 466 and consists of a tool having a cutting edge and a tool-holding fixture into which the tool is put. Equipment for setting the radial position of the cutting edge with regard to the axis of rotation is supplied in this tool head. This equipment consists of a pressing power converter between the base portion of the tool head and a driven element. Elastic swivel elements in the form of a parallel spring are provided between these parts that have different extension characteristics. The adjustment movement initiated through the pressing power converter is converted into a movement of the tool here, which is rigidly connected to the driven element. The radial position of the cutting edge of the tool is adjusted via these swivel elements.

There is a major need for manufacturing cylinder jacket surfaces, in particular, as dimensionally precise as possible. An excursion of approximately 0.1 mm is required here for the pure tool correction. Furthermore, fairly small plunge cuts and back-offs should also be possible, for which an adjustment distance of 2 to 3 mm is needed, however. This adjustment range is hardly capable of being realized in a reproducible fashion, though, with the known tool heads.

The problem of further developing a tool head of this type in such a way that a simple possibility of adjusting the cutting edge in a radial direction is created that permits both fairly large adjustment amounts, as well as an adjustment lying away from the axis of rotation, is a basis of the invention.

This problem is solved by the invention described herein.

The knowledge that greater adjustment possibilities of the cutting edge, with greater precision and other constructive possibilities, result through the transfer of the adjustment process with regard to bearing systems arranged in an eccentric fashion to each other known from another area to a tool head is a basis for the invention. On top of that, tool heads have a simple structure because of this.

SUMMARY OF THE INVENTION

The invention involves a tool head 10, which can be rotated around an axis of rotation 24, with a tool-holding fixture 14, 16 for a tool 20 having a cutting edge 18 and with equipment 38, 40, 44 for adjustment of the radial position of the tool cutting edge 18 with regard to the axis of rotation 24. The invention distinguishes itself by the fact that the tool-holding fixture is divided up into a base element 14, which is supported in a first bearing system 40 in a carrier sleeve 44 so as to be able to rotate around the axis of rotation 24, and a tool-holding element 16, which is supported in a second bearing system 38 in the carrier sleeve 44 so as to be able to rotate around an eccentric axis 42 that is positioned in an eccentric fashion, as well as in parallel to, the axis of rotation 24. The carrier sleeve 44 can be rotated around the axis of rotation 24, the axis of rotation 24 and the eccentric axis 42 lie on a guide line 52, and the tool-holding element 16 and the base element 14 are coupled to each other through a radial guide 48, 50 so as to be secure against twisting and capable of moving along the guide line 52 in such a way that the distance between the tool-holding element 16 and the base element 14, and consequently between the axis of rotation 24 and the eccentric axis 42, change via movement of the carrier sleeve 44 around the axis of rotation 24.

In accordance with the invention, the tool-holding fixture of the tool head is divided up into a base element, which is supported in a first bearing system in a carrier sleeve so as to be capable of rotating around the axis of rotation, and into a tool-holding element, which is supported in a second bearing system in the carrier sleeve so as to be capable of rotating around an eccentric axis lying parallel and in an eccentric fashion to the axis of rotation. The carrier sleeve can be rotated around the axis of rotation here, the axis of rotation and the eccentric axis lie in a guide line, and the tool-holding element and the base element are coupled with each other in a manner that is secure against twisting and that permits motion along the guide line in such a way that the distance between the tool-holding element and the base element, and consequently between the axis of rotation and the eccentric axis, changes by moving the carrier sleeve around the axis of rotation.

Radial adjustment movements can be carried out because of this in a simple way, without axial changes in the position of the cutting edge coming about. The radial adjustment movements can also include fairly large adjustment distance according to this principle. The maximum distance between the eccentric axes corresponds in the process to half a revolution. If, for example, the maximum distance is 0.1 mm, then the adjustment possibility is 0.1 mm/360°. This results in high resolution with good precision adjustment.

By turning the carrier sleeve around an angle of 90°, the distance of the axis of rotation to the eccentric axis changes between 0 and the maximum, for example 3 mm.

In accordance with one design form of the invention, the carrier sleeve has been developed as a handle for manual turning around the axis of rotation. This makes quick manual adjustment possible; the carrier sleeve is scaled here, in order to note the rotation movement. Adjustment is only possible when the tool head is at a standstill here.

As an alternative or supplement to this, the carrier sleeve works together with a drive unit, in particular an electrical one. It is then possible because of this to carry out precision adjustments even during the circulation of the tool head.

As an example, the electrical drive unit includes a rotor disk that is located on the outside of the carrier sleeve, and a drive unit coil that is located above and below the rotor disk, that are each connected to the drilling head. The carrier sleeve can now be moved in one direction or another in a simple fashion through the rotor disk by exciting the drive unit coils, and the radial position of the tool-holding element and of the cutting edge can consequently be adjusted.

In accordance with one design form of the invention, a joint spring is provided between a first bearing system and the tool-holding fixture, and the second bearing system and the base element, in particular a parallel spring, that permits relative movement of the tool-holding fixture vis-a-vis the base element. Special forms of tool-holding fixtures and special construction designs for axially securing the tool-holding fixture can be used because of this. The spring serves as a transfer element of the adjustment movement to the tool-holding element in the process. The spring completely encompasses the tool-holding element and the base element in sections.

In accordance with one preferred design form of the invention, the spring has a first recess in the cross-section running in parallel to the axis of rotation, to which a second recess vertically extends. In particular, the second recess is open towards the inside.

An equalization disk is put into the second recess so that the spring can also transfer axial forces. The equalization disk is preferably coated and/or surface-treated for better sliding. It can also have roller guides, though.

In order to transfer forces from the spindle driving the tool head without a float and in order to avoid tolerance-related cutting edge maladjustment from coming about, the tool-holding element and the base element are braced together with each other in the axial direction in an adjustable way.

In accordance with one design form of the invention, the drive unit generates oscillating, angular movement. Non-circular bore holes can be created in a simple way because of this.

The drive unit for the carrier sleeve can also be designed so as to be mechanical; in particular it can include a friction wheel, a toothed rack or a ratchet wheel for the fine adjustment of the carrier sleeve.

The base element is preferably an integral part of the spindle.

Other benefits and features arise from the following description of three design forms of the invention in connection with the drawing.

DESCRIPTION OF THE INVENTION

Figure 1:
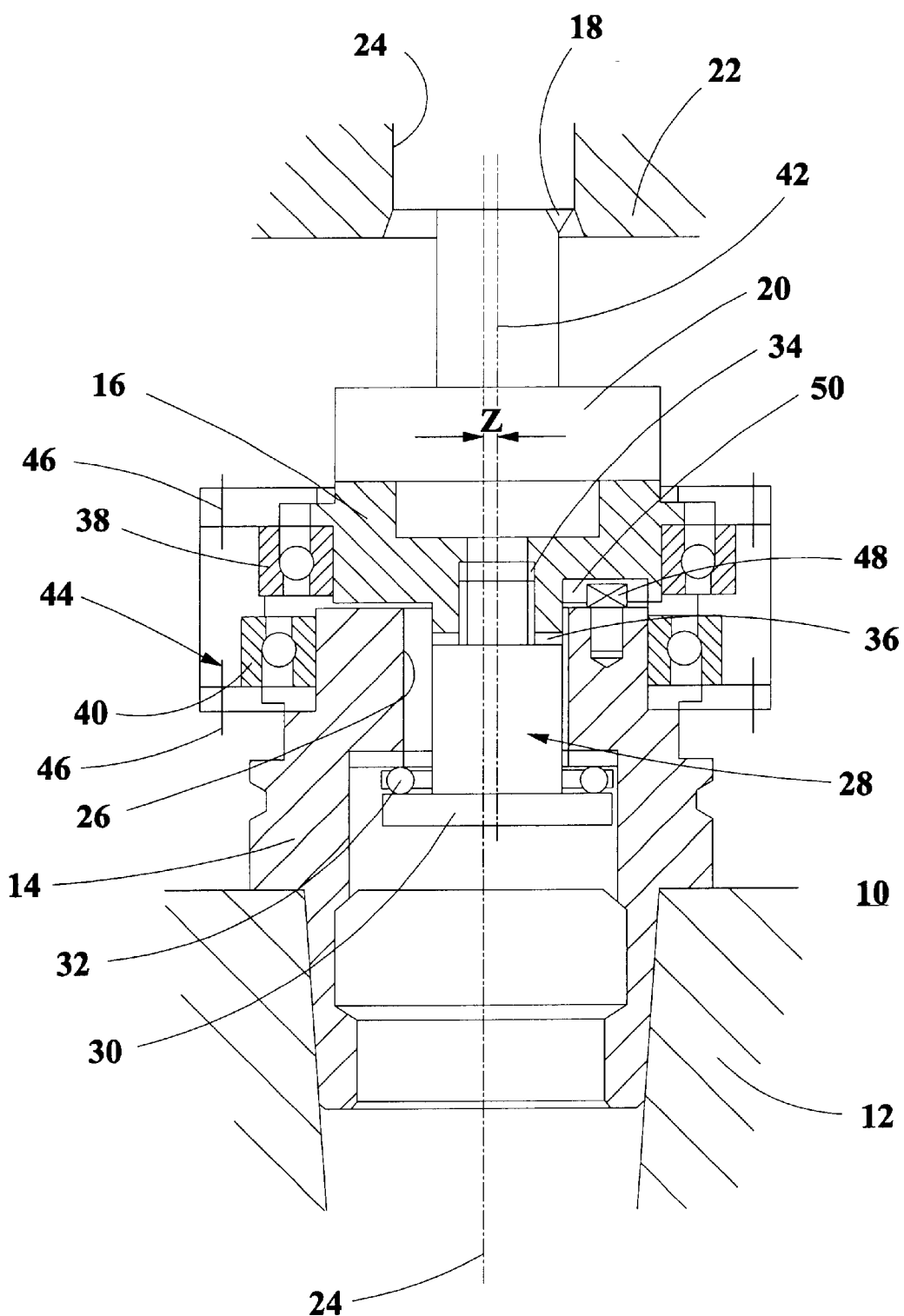
FIG. 1 shows a sectional view of a tool head with an intimated tool and workpiece to be processed in accordance with a first design form of the invention.

A List of Reference Symbols used follows:

10 Toolhead
12 Tool spindle
14 Base element
16 Tool-holding element
18 Tool cutting edge
20 Tool
22 Workpiece
24 Axis of rotation
26 Bore hole of the base element
28 Tension screw
30 Head of the tension screw
32 Ball bearing system
34 Threaded bore hole of the tool-holding element
36 Thread section
38 Ball bearing system—tool-holding element
40 Ball bearing system—base element
42 Eccentric axis
44 Carrier sleeve
46 Cover
48 Guide pin
50 Groove
52 Guide line
54 Rotor disk
56 Drive unit coil
58 Parallel spring
60 First recess
62 Second recess
64 Bridging piece
66 Slide disk
68 Connecting rod
M1 Cut-through of the axis of rotation
M2 Cut-through of the eccentric axis
Z Distance of the axis of rotation and the eccentric axis A tool head 10 is shown in a cross-sectional view in FIG. 1 that is put into a tool spindle 12. The tool head 10 has a base element 14, as well as a tool-holding element 16 engaging in the base element 14. A tool 20 having a cutting edge 18 is put into the tool-holding element 16. The tool 20 is shown with a dot-and-dash pattern. The cutting edge 18 is for machining a workpiece 22, in particular a bore hole 24 put into the workpiece 22.

The tool spindle 12 and the tool head 10 are connected with each other in a fixed way and can be rotated around an axis of rotation 24.

The base element 14 has been provided with a bore hole 26. The tool-holding element 16 engages in this bore hole 26 in sections; it has radial float in this bore hole 16 in the process.

A tension screw 28 engages in the bore hole 26 from the side of the bore hole 26 that is removed from the tool-holding element 16. The head 30 of the tension screw 28 lies on a ball bearing system 32 adjacent to the base element 14.

The tension screw 28 engages in a concentric fashion in a threaded bore hole 34 with a threaded section 36 located in the center of the tool-holding element 16. The bore hole, together with the tool-holding element 16, is shifted out of its concentric position in the bore hole 26 with regard to the axis of rotation 24.

A ball bearing system 38 lies laterally adjacent to the tool-holding element 16, and a ball bearing system 40 lies laterally adjacent to the base element 14.

The ball bearing system 38 and the ball bearing system 40 are displaced with regard to one another. The ball bearing system 40 is arranged so as to be concentric with the axis of rotation 24, and the ball bearing system 38 is arranged so as to be concentric with an eccentric axis 42. The ball bearing system 38 and the ball bearing system 40 are connected in a fixed manner through the carrier sleeve 44, which covers the bearing system 38 or 40 with a cover at the top and the bottom in each case.

The displacement of ball bearing systems 38 and 40 to each other, thus the eccentricity of ball bearing system 38 vis-a-vis ball bearing system 40, and consequently the distance of the axis of rotation 24 from the eccentric axis 42, is crucial for the maximum radial adjustment capability of the tool cutting edge 18 with the tool-holding element 16 vis-a-vis the base element 14 and the axis of rotation 24, as will be explained more precisely below. A guide pin 48 is put into a bore hole on the side of the base element 14 turned towards the tool-holding element 16; the head of the guide pin sticks out into a groove 50 in the tool-holding element 16. The groove 50 extends in the direction of a guide line 52 that runs vertically to the axis of rotation 24 and to the eccentric axis 42 and connects these, see FIG. 2. The tool-holding element 16, which is supported so as to be capable of turning vis-a-vis the base element 14, is secured against twisting because of this. Only a radial movement along the groove 50 is now possible.

FIG. 1 shows the maximum distance between the axis of rotation 24 and the eccentric axis 42. Because the carrier sleeve 44 is now connected in a fixed way with both the bearing system 38, as well as with the bearing system 40, and the maximum eccentricity of the bearing system 38 vis-a-vis the bearing system 40 is reflected in the shape on the respective inside of the carrier sleeve 44, the position of the tool-holding element 16 is changed vis-a-vis the base element 14 by turning the carrier sleeve 44.

The inside of the carrier sleeve 44 correspondingly presses the bearing system 38 inwards or outwards with regard to the axis of rotation 24 here, because only a radial movement of the tool-holding element 16 vis-a-vis the base element 14 is permitted through the guide pin 48 and the groove 50, as mentioned above. By turning the carrier sleeve 44 over 90°, the tool-holding element is brought out of its maximum eccentricity, as it is shown in FIG. 1, so far in the direction of the axis of rotation 44 that the eccentric axis 42 and the axis of rotation 24 run in a congruent course.

The carrier sleeve 44 has been designed as a handle for manual adjustment and has a scaling feature. The tool head 10 and consequently the tool spindle 12 have to stand still for an adjustment of the tool-holding element 16 vis-a-vis the base element 14, and consequently the tool cutting edge 18, with regard to the axis of rotation 24.

Figure 2:
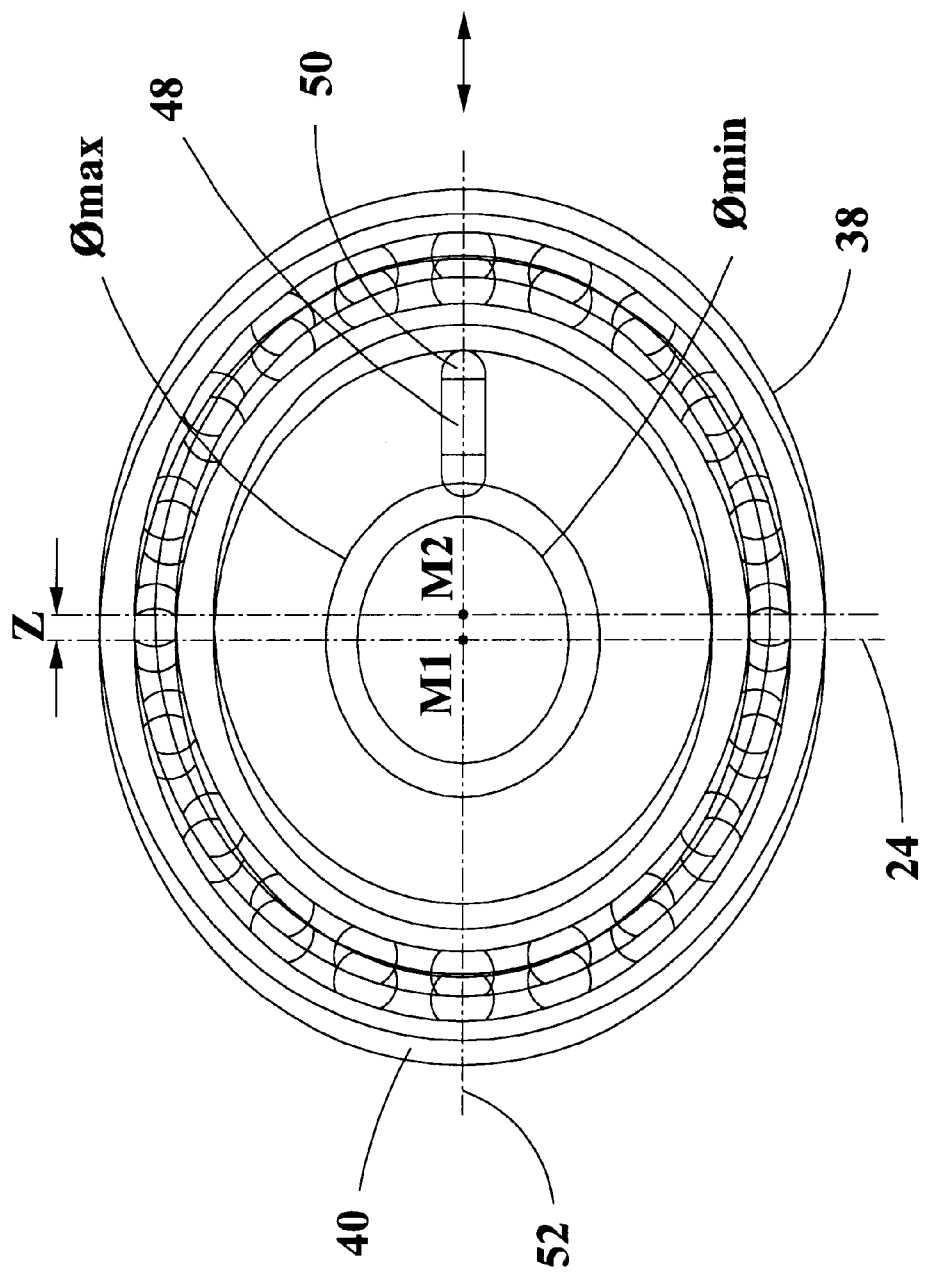
FIG. 2 shows a top view of a schematic representation of the bearings of the tool-holding element and of the base element of FIG. 1.

The bearing systems 38 and 40 are shown in a top view in FIG. 2; M1 shows the center point for the bearing system 40 and consequently the cut-through of the axis of rotation 24, and M2 shows the center point of the bearing system 38 and consequently the cut-through of the eccentric axis 42. In addition, the groove 50 with the head of the guide pin 48 can be recognized.

Figure 3:
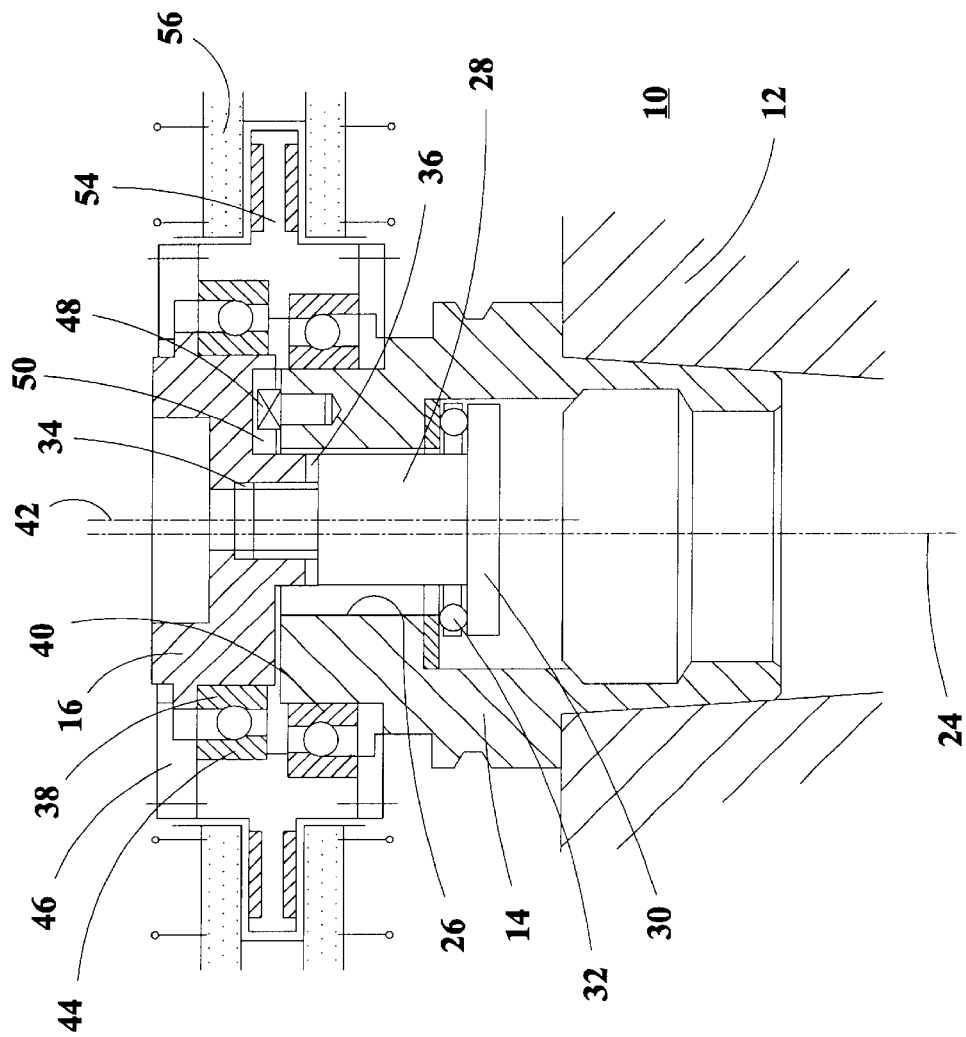
FIG. 3 shows a sectional view of a tool head in accordance with a second design form of the invention and FIG. 4 shows a sectional view of a tool head in accordance with a third design form of the invention.

Another design form of the invention is presented in FIG. 3. It essentially corresponds to the design form presented in FIG. 1, but the tool head 10 is presented without a tool 20 and a workpiece to be processed 22.

The carrier sleeve 44 has been provided with a rotor disk 54 on its outside. The rotor disk 54 completely encompasses the carrier sleeve 44.

A drive unit coil 56 is provided above and below the rotor disk 54 in each case, the coil is likewise arranged so as to run around the rotor disk 54 and is connected to the drive spindle 12. The adjustment of the carrier sleeve 44 and consequently the eccentricity Z, and thus the distance of the axis of rotation 24 from the eccentric axis 42, can be simply set through the electrical drive unit made up of the rotor disk 54 and the drive unit coil 56. The drive unit is actuated in accordance with the desired adjustment, and the rotor disk 54 is moved vis-a-vis the drive unit coil 56 and consequently the carrier sleeve 44.

It is possible for the carrier sleeve 44 to make oscillating angular movements with the aid of the electrical drive unit made up of the rotor disk and drive unit coils 56 during the turning of the tool head 10 with a simple effort of the control unit. Non-circular bore holes can then be created in a simple way here.

Figure 4:
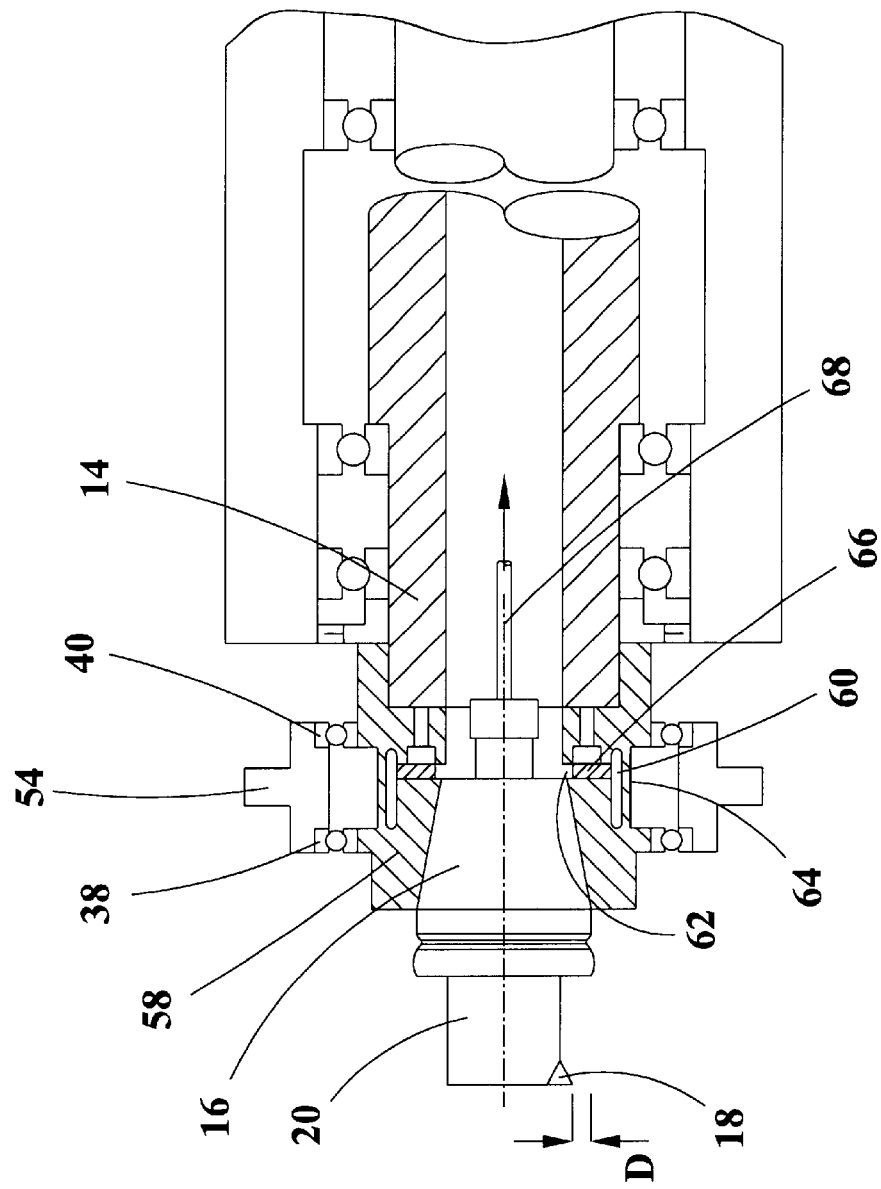
Figure 5:
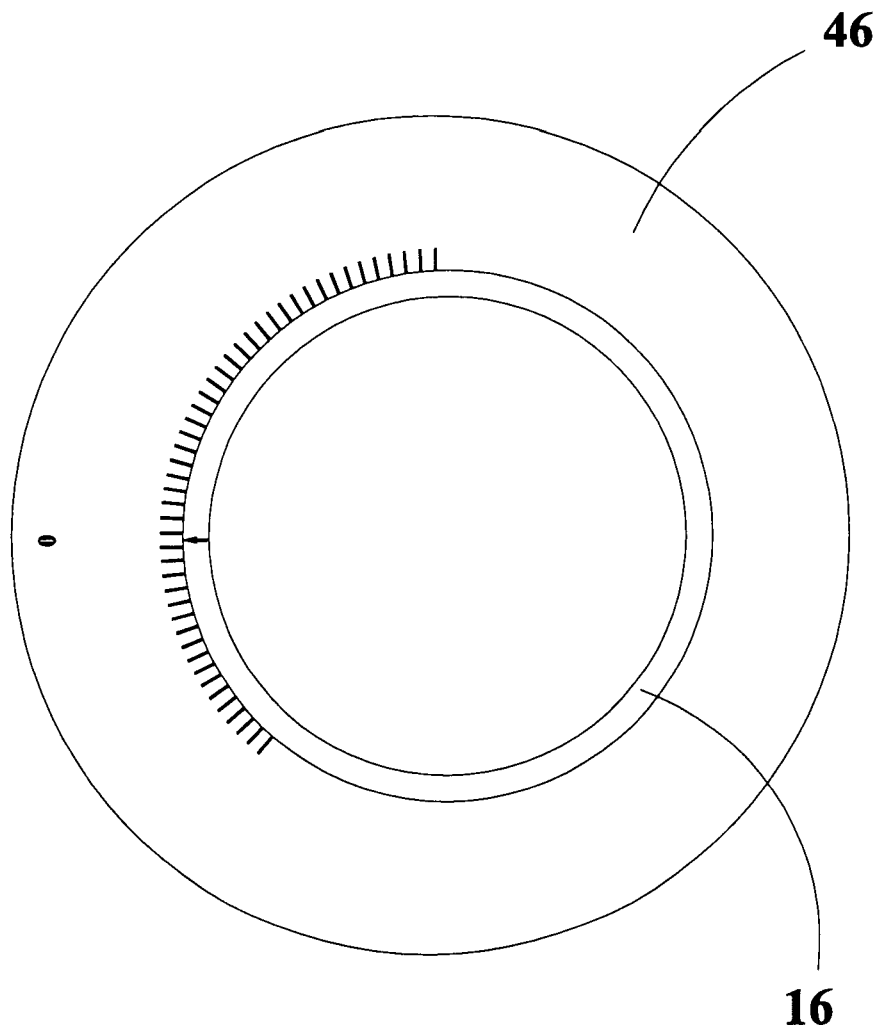
FIG. 5 illustrates the scaling of the carrier.

Another design form of the invention is presented in FIG. 4. A parallel spring is additionally located between the tool-holding element 16 and the base element 14 here. The ball bearing systems 38 and 40, as well as the carriers sleeve 44 with the rotor disk 54, are located on the outside of the parallel spring 58. The drive unit coil 56 is not shown for reasons of clarity.

The parallel spring 58 has a first recess 60, which essentially runs in parallel with, as well as around, the axis of rotation 24.

A second recess 62 extends vertically here that is open towards the tool-holding element 16. The parallel spring 58 is split up in two parts through this, namely into a part assigned to the tool-holding element 16, and a part assigned to the base element 14. Both parts are connected to each other via a bridging piece 64 that results from the formations of the recesses 60 and 62. A sliding disk 66 is put into the second recess 62 to take up axial forces.

The parallel spring 58 is for transferring the adjustment movement to the tool-holding element 16 when it has a special form—conical here. In addition, a connecting rod 68 is provided that braces the tool-holding element 16 together with the base element 14, which is a part of the drive spindle 12.

A possibility for a tool correction is created, for the precision adjustment of tool cutting edges even during the rotation, with the tool head 10. The adjustment either takes place mechanically or electrically through the ball bearing systems 38 and 40 that are arranged in an eccentric fashion with regard to each other. The maximum eccentricity of the two ball bearing systems 38 and 40 corresponds to the desired correction or readjustment range of the tool cutting edge 18.

The special feature of the eccentric precision adjustment is the robust and simple structure and the adjustment through the carrier sleeve 44. All of the eccentric drive units known up until now are driven axially and are therefore not capable of being used in processing centers, because axial tool clamping equipment is provided there, for example.

The design form in accordance with FIG. 1 can be adjusted manually. The carrier sleeve 44 is scaled for this. The precision adjustment is only possible at a standstill here.

In accordance with other design forms that are not presented here, a semiautomatic precision adjustment of the carrier sleeve 44 is also possible through a friction wheel, a toothed rack or a ratchet wheel. The adjustment drive unit moves in a radial fashion from the outside through the carrier sleeve 44 for all three drive unit variations. The precision adjustment also only takes place with a standstill of the spindle 12 with these drive units.

The automatic precision adjustment in the case of a rotating spindle 12 and a rotating tool 20 is possible with the design forms in accordance with FIGS. 3 and 4. The carrier sleeve 44 is coupled to a torque or linear motor, which is attached in a fixed way to the spindle 12, through the rotor disk 44. An angle for a corresponding change in the eccentricity, so a corresponding change of the position of the tool cutting edge 18, results through an electrical drive regulations unit. An oscillating angular movement is possible with a drive unit with the appropriate speed, in order to also be able to produce non-circular bore holes.

The invention distinguishes itself by the fact that it has a simple structure and has a high level of precision when adjusting the position of the tool cutting edge 18.

The invention has been set forth with particularity herein. Those skilled in the art will readily recognize that changes and modifications may be made to the invention without departing from the spirit and scope of the appended claims.

What is claimed is:

1. Tool head (10) that can be rotated around an axis of rotation (24), with a tool-holding fixture (14, 16) for a tool (20) having a cutting edge (18) and with equipment (36, 40, 44) to adjust the radial position of the tool edge (18) with regard to said axis of rotation (24), characterized by said tool-holding fixture being divided up into a base element (14), which is supported in a first bearing system (40) in a carrier sleeve (44) so as to be able to rotate around said axis of rotation (24), and into a tool-holding element (16) that is supported in a second bearing system (38) in the carrier sleeve (44) so as to be able to rotate around an eccentric axis (42) situated in an eccentric and parallel fashion to said axis of rotation (24), carrier sleeve (44) can be rotated around said axis of rotation (24), said axis of rotation (24) and said eccentric axis (42) lie on a guide line (52), said tool-holding element (16) and said base element (14) are coupled to each other through a radial guide (48, 50) in a manner that is secure against twisting and that permits motion along the guide line (52) in such a way that the distance between said tool-holding element (16) and said base element (14), and consequently between said axis of rotation (24) and said eccentric axis (42), changes by moving said carrier sleeve (44) around said axis of rotation (24).

2. Tool head according to claim 1, characterized by said carrier sleeve (44) being designed as a handle for manual turning around said axis of rotation (24).

3. Tool head according to claim 1 characterized by said carrier sleeve (44) being scaled for setting the radial position of said tool-holding element (16) vis-a-vis said axis of rotation (24).

4. Tool head according to claim 2 characterized by said carrier sleeve (44) being scaled for setting the radial position of said tool-holding element (16) vis-a-vis said axis of rotation (24).

5. Tool head according to claim 3 characterized by said carrier sleeve (44) operating in coordination with a drive unit (54, 56).

6. Tool head according to claim 4, characterized by an electrical drive unit (54, 56).

7. Tool head according to claim 5, characterized by an electrical drive unit (54, 56).

8. Tool head according to claim 7, characterized by said electrical drive unit including a rotor disk (54) that is located on the outside of said carrier sleeve (44) and a drive unit coil (56) located above and below said rotor disk (54), which is connected to a spindle (12) or the like acting in coordination with said tool head (10).

9. Tool head according to claim 8 characterized by a joint spring (58), in particular a parallel spring, being provided between said first bearing system (40) and said tool-holding element (16), and said second bearing system (38) and said base element (14), and, said joint spring permits radial relative movement of said tool-holding element (16) vis-a-vis said base element (14).

10. Tool head according to claim 9, characterized by said spring (58) completely encompassing said tool-holding element (16) and said base element (14) in sections.

11. Tool head according to claim 10, characterized by said spring (58) having a first recess (60) in the cross-section running in parallel to said axis of rotation (24), to which a second recess (62) extends vertically.

12. Tool head according to claim 11, characterized by said second recess (62) being open towards the inside.

13. Tool head according to claim 12, characterized by an equalization disk (66) being put into said second recess (62).

14. Tool head according to claim 13, characterized by said equalization disk (66) being coated and/or having a treated surface for better sliding.

15. Tool head according to claim 1 characterized by said tool-holding element (16) and said base element (14) being braced together with each other so as to be adjustable in the axial direction.

16. Tool head according to claim 1 characterized by said drive unit (54, 56) creating an angular, oscillating movement.

17. Tool head according to claim 5 characterized by a mechanical drive unit.

18. Tool head according to claim 17, characterized by said mechanical drive unit including a friction wheel, a toothed rack or a ratchet wheel for the fine adjustment of said carrier sleeve (44).

19. Tool head according to claim 8 characterized by said base element (14) being an integral part of said spindle (12).

* * * * *